(12) United States Patent
Dvory et al.

(10) Patent No.: US 11,070,953 B2
(45) Date of Patent: Jul. 20, 2021

(54) TRIGGERED WIRELESS ACCESS PROTOCOL

(71) Applicant: Apple Inc., Cupertino, CA (US)

(72) Inventors: Yaniv Dvory, Kfar Saba (IL); Hay Lev, Modi'in (IL); Yoel Boger, Shoham (IL); Oren Shani, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/644,495

(22) Filed: Jul. 7, 2017

(65) Prior Publication Data
US 2018/0014325 A1    Jan. 11, 2018

Related U.S. Application Data

(60) Provisional application No. 62/359,940, filed on Jul. 8, 2016, provisional application No. 62/359,941, filed on Jul. 8, 2016.

(51) Int. Cl.
| | |
|---|---|
| *H04W 4/00* | (2018.01) |
| *H04W 4/08* | (2009.01) |
| *H04L 5/00* | (2006.01) |
| *H04W 74/06* | (2009.01) |
| *H04W 72/04* | (2009.01) |
| *H04W 74/00* | (2009.01) |
| *H04W 74/04* | (2009.01) |
| *H04W 84/12* | (2009.01) |
| *H04W 88/08* | (2009.01) |
| *H04W 88/02* | (2009.01) |

(52) U.S. Cl.
CPC .............. *H04W 4/08* (2013.01); *H04L 5/0007* (2013.01); *H04L 5/0048* (2013.01); *H04L 5/0051* (2013.01); *H04W 72/0446* (2013.01); *H04W 74/006* (2013.01); *H04W 74/04* (2013.01); *H04W 74/06* (2013.01); *H04W 84/12* (2013.01); *H04W 88/02* (2013.01); *H04W 88/08* (2013.01)

(58) Field of Classification Search
CPC ....................................................... H04W 4/08
See application file for complete search history.

(56) References Cited

U.S. PATENT DOCUMENTS

| | | | |
|---|---|---|---|
| 10,057,806 B2* | 8/2018 | Hedayat | ............ H04W 28/0268 |
| 10,070,458 B2* | 9/2018 | Ferdowsi | .......... H04W 72/1268 |
| 2002/0093929 A1 | 7/2002 | Mangold et al. | |

(Continued)

*Primary Examiner* — Gerald A Smarth
(74) *Attorney, Agent, or Firm* — Dickinson Wright RLLP

(57) ABSTRACT

An access point transmits a trigger frame to a set of electronic devices in a wireless local area network (WLAN). The access point receives, from one or more electronic devices in a set of electronic devices, one or more requests to send data. In response, the access point transmits the trigger frame, which includes information specifying an ordered list of electronic devices in the set of electronic devices that are allowed to transmit. Subsequently, the access point sequentially receives one or more frames from the ordered list of electronic devices. After receiving a frame from the last electronic device in the ordered list of electronic devices or after an unused transmit opportunity of the last electronic device in the ordered list of electronic devices, the access point transmits a block acknowledgment to the ordered list of electronic devices.

17 Claims, 12 Drawing Sheets

(56) References Cited

U.S. PATENT DOCUMENTS

| | | | |
|---|---|---|---|
| 2004/0264428 A1* | 12/2004 | Choi | H04W 48/08 |
| | | | 370/338 |
| 2007/0287456 A1* | 12/2007 | Shimizu | H04W 52/0251 |
| | | | 455/435.1 |
| 2011/0150004 A1* | 6/2011 | Denteneer | H04L 5/0023 |
| | | | 370/476 |
| 2011/0261742 A1* | 10/2011 | Wentink | H04L 1/1854 |
| | | | 370/312 |
| 2012/0093517 A1* | 4/2012 | Rajagopal | H04B 10/116 |
| | | | 398/130 |
| 2013/0083722 A1* | 4/2013 | Bhargava | H04W 48/20 |
| | | | 370/315 |
| 2015/0146654 A1* | 5/2015 | Chu | H04L 5/0055 |
| | | | 370/329 |
| 2015/0245282 A1* | 8/2015 | Kim | H04W 48/20 |
| | | | 370/338 |
| 2015/0264551 A1* | 9/2015 | Ko | H04W 72/0446 |
| | | | 370/329 |
| 2016/0066318 A1* | 3/2016 | Pereira | H04W 74/06 |
| | | | 370/329 |
| 2016/0100408 A1* | 4/2016 | Hedayat | H04L 65/4076 |
| | | | 370/329 |
| 2016/0242177 A1 | 8/2016 | Seok | |
| 2016/0315681 A1* | 10/2016 | Moon | H04B 7/0621 |
| 2016/0330732 A1* | 11/2016 | Moon | H04B 7/0617 |
| 2016/0345362 A1* | 11/2016 | Lee | H04W 74/0816 |
| 2016/0360443 A1 | 12/2016 | Hedayat | |
| 2016/0360507 A1* | 12/2016 | Cariou | H04W 72/04 |
| 2017/0347347 A1* | 11/2017 | Yang | H04W 74/0816 |
| 2017/0367141 A1* | 12/2017 | Nagasaka | H04W 76/16 |
| 2018/0014165 A1 | 1/2018 | Li et al. | |

\* cited by examiner

TRIGGERED WIRELESS ACCESS PROTOCOL

CROSS-REFERENCE TO RELATED APPLICATIONS

This Application claims the benefit of U.S. Provisional Patent Application No. 62/359,940, entitled "TRIGGERED WIRELESS ACCESS PROTOCOL" filed Jul. 8, 2016, and the benefit of U.S. Provisional Patent Application No. 62/359,941, entitled "TRIGGERED WIRELESS ACCESS PROTOCOL" filed Jul. 8, 2016, the contents of both of which are incorporated by reference herein in their entireties for all purposes.

FIELD

The described embodiments relate, generally, to wireless communications among electronic devices in a wireless local area network (WLAN), including electronic devices and access points, and techniques for controlling channel access by transmitting one or more trigger frames from an access point to the electronic devices.

BACKGROUND

Many wireless local area networks (WLANs), such as those based on a communication protocol that is compatible with an Institute of Electrical and Electronics Engineers (IEEE) 802.11 standard, also referred to as 'Wi-Fi', involve contention-based distributed access systems. For example, Wi-Fi often uses single-user transmission via enhanced distributed channel access (EDCA). Usually, the WLANs are contention based because they typically utilize unlicensed frequency bands or spectra, which are unpredictable and are often subject to interference. The unpredictability of the interference can make coordination across multiple electronic devices, also referred to as 'stations' (STAs), challenging (especially for an unmanaged WLAN), and can result in failure of a collision free period (CFP). The use of fully distributed channel access, however, can allow a low complexity access point (AP) and a simpler network deployment (relative to a cellular network) of a WLAN.

Contention-free multi-user transmission in uplink has been proposed for inclusion in the IEEE 802.11ax standard. This approach can dramatically change how an electronic device accesses the communication medium. In particular, an electronic device can transmit without contending for the communication medium. Instead, an access point controls access to the communication medium for the electronic device by granting transmission opportunities to the electronic device using a trigger frame (which is sometimes referred to as 'trigger-based access' or 'trigger-based channel access,' e.g., uplink multi-user transmission). Using trigger-based uplink channel access, an access point senses the communication medium and, as needed, performs a backoff process on behalf of potential uplink trigger-access-enabled electronic devices. Then, the access point may send a trigger frame with multi-user allocation information for the electronic devices. In response to the trigger frame, the electronic devices send uplink traffic on allocated-resource units in a synchronized manner in a multi-user transmission.

In principle, the use of trigger-based access and multi-user transmission can significantly reduce contention for access to the communication medium by the electronic devices in the WLAN. Consequently, trigger-based access is expected to result in improved communication performance.

Trigger-based access and multi-user transmission, however, can significantly increase energy consumption of the electronic devices in the WLAN. In particular, for N electronic devices sharing a channel, the average data bandwidth may be reduced by a factor of N and, therefore, the energy required to transmit the data may be increased by a factor of N. Moreover, the access overhead in the WLAN typically increases with trigger-based access and multi-user transmission. Furthermore, this approach for allocating shared resources can be inefficient (including wasted or unused resource units and, more generally, suboptimal channel utilization) and inflexible (because the electronic devices may need to transmit over the same duration time period using identical data rates). In addition, trigger-based access and multi-user transmission is not backwards compatible with existing or legacy electronic devices.

SUMMARY

Some embodiments are described that relate to an access point that transmits a trigger frame to a set of electronic devices in a WLAN. In particular, during operation, an interface circuit in the access point may optionally receive, from one or more electronic devices in the set of electronic devices, one or more requests to send data. In response, the interface circuit may transmit the trigger frame including information specifying an ordered list of electronic devices in the set of electronic devices that are allowed to transmit. Subsequently, the interface circuit may sequentially receive one or more frames from the ordered list of electronic devices.

A frame received from a given electronic device in the ordered list of electronic devices may have an arbitrary length and an arbitrary data rate (e.g., the lengths and/or the data rates of two or more of the frames received from the ordered list of electronic devices may be different from each other).

The information included in the trigger frame may specify a maximum frame duration, and the one or more frames received form the ordered list of electronic devices may have a duration that is less than or equal to the maximum frame duration.

Furthermore, the information specifying the ordered list of electronic devices may be included in a field following a media access control (MAC) header.

Additionally, the information may specify explicit triggering. In these embodiments, the interface circuit may transmit an additional trigger frame to the given electronic device in the ordered list of electronic devices, and the interface circuit may receive the frame from the given electronic device in response to the additional trigger frame.

Moreover, the information may specify that each of the electronic devices in the ordered list of electronic devices responds to the trigger frame, and the interface circuit receives a frame from each of the electronic devices in the ordered list of electronic devices.

In some embodiments, the interface circuit is compatible with an IEEE 802.11 standard that includes trigger-based channel access, and communicates with one or more legacy electronic devices that are not compatible with the IEEE 802.11 standard (i.e., that do not use multi-user trigger-based channel access).

Furthermore, the interface circuit may transmit, to the ordered list of electronic devices, a block acknowledgment.

Other embodiments include operation with or by the electronic device. In particular, during operation, an interface circuit in the electronic device may optionally transmit, to the access point, a request to send data. In response, the interface circuit may receive a trigger frame that includes information specifying an ordered list of electronic devices in the set of electronic devices that are allowed to transmit, where the information includes an identifier of the electronic device. Subsequently, the interface circuit may transmit a frame to the access point, where the frame is transmitted at a temporal position in a sequence of one or more frames from the ordered list of electronic devices.

Note that a transmit power of the interface circuit may be proportional to a transmit bandwidth of the electronic device (as opposed to a number of electronic devices in the ordered list of electronic devices).

Moreover, the information may specify a maximum frame duration, and the interface circuit may select an amount of data to include in the frame and a data rate such that the frame has a duration that is less than or equal to the maximum frame duration.

Furthermore, the information may specify explicit triggering. In these embodiments, the interface circuit may receive an additional trigger frame from the access point, and the interface circuit may transmit the frame in response to the additional trigger frame.

Additionally, the information may specify that each of the electronic devices in the ordered list of electronic devices responds to the trigger frame, and the interface circuit may transmit a null frame even when there is no queued data.

Note that the interface circuit may transmit the frame after another frame is transmitted by a preceding electronic device in the ordered list of electronic devices or a time slot after an unused transmit opportunity of the preceding electronic device.

Moreover, the interface circuit may receive, from the access point, a block acknowledgment.

Other embodiments provide an interface circuit in the access point or the electronic device.

Other embodiments provide a computer-program product for use with the interface circuit in the access point and/or the electronic device. This computer-program product includes instructions for at least some of the aforementioned operations performed by the interface circuit in the access point or the electronic device.

Other embodiments provide a method for transmitting a trigger frame or a frame. The method includes at least some of the aforementioned operations performed by the interface circuit in the access point or the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
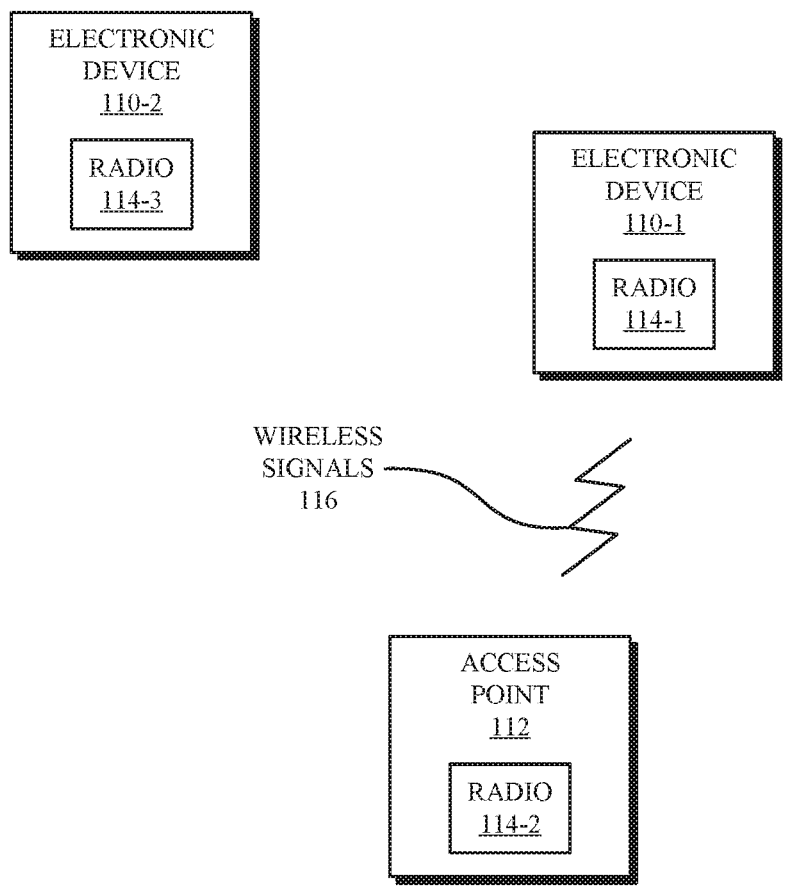
FIG. 1 is a block diagram illustrating an example of electronic devices communicating wirelessly.

Table 1 provides performance information for a multi-user trigger-based channel-access technique.

Table 2 provides performance information for a Triggered Wi-Fi Access Protocol (TWAP).

Note that like reference numerals refer to corresponding parts throughout the drawings. Moreover, multiple instances of the same part are designated by a common prefix separated from an instance number by a dash.

DETAILED DESCRIPTION

An access point may transmit a trigger frame to a set of electronic devices in a WLAN. In particular, during operation, the access point may receive, from one or more electronic devices in a set of electronic devices, one or more requests to send data. In response, the access point may transmit the trigger frame that includes information specifying an ordered list of electronic devices in the set of electronic devices that are allowed to transmit. Subsequently, the access point may sequentially receive one or more frames from the ordered list of electronic devices. After receiving a frame from the last electronic device in the ordered list of electronic devices or after an unused transmit opportunity of the last electronic device in the ordered list of electronic devices, the access point may transmit a block acknowledgment to the ordered list of electronic devices.

By specifying and selectively triggering the ordered list of electronic devices, this communication technique may significantly reduce the transmit power of the electronic devices in the WLAN relative to many existing channel-access techniques, e.g., based on Orthogonal Frequency Division Multiple Access (OFDMA). In addition, the communication technique may ensure efficient channel utilization (by eliminating or eliminating wasted or unused bandwidth), reduced overhead, increased flexibility (e.g., the electronic devices in the ordered list of electronic devices may transmit different amounts of data and/or may use different data rates), and/or may be backwards compatible with existing/legacy electronic devices that do not use multi-user trigger-based channel access. In the process, the communication technique may reduce contention in the WLAN by facilitating trigger-based channel access and may improve the communication performance in the WLAN. Consequently, the communication technique may improve the user experience when using the access point or one of the electronic devices, and thus may increase customer satisfaction and retention.

Note that the communication technique may be used during wireless communication between electronic devices in accordance with a communication protocol, such as: an IEEE 802.11 standard (also referred to as Wi-Fi). For example, the communication technique may be used with IEEE 802.11ax, which is used as an illustrative example in the discussion that follows. However, this communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations (STAs), client devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram 100 illustrating an example of electronic devices communicating wirelessly. In particular, one or more electronic devices 110 (such as a smartphone, a laptop computer, a notebook computer, a tablet, or another such electronic device, which is sometimes referred to as a 'primary electronic device') and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device.

As described further below with reference to FIG. 12, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. For example, one or more of electronic devices 110 (which are sometimes referred to as a 'set of electronic devices') may transmit one or more frames to access point 112 that include one or more requests that indicate that at least a subset of electronic devices 110 have uplink data. As illustrated further below with reference to FIGS. 2-4, in response access point 112 may transmit a trigger frame to the one or more of electronic devices 110. This trigger frame may include information specifying an ordered list of electronic devices in the one or more of electronic devices 110 that are allowed to transmit. For example, the information specifying the ordered list of electronic devices (such as identifiers of the electronic devices in the ordered list of electronic devices) may be included in dedicated information bytes in a field following a MAC header.

In response to the trigger frame, the one or more of electronic devices 110 in the ordered list of electronic devices (such as electronic device 110-1) may sequentially transmit one or more frames to access point 112 at temporal positions or access opportunities that correspond to or are based on the ordered list of electronic devices. For example, a given electronic device in the ordered list of electronic devices may transmit a frame in a sequences of one or more frames after another frame is transmitted by a preceding electronic device in the ordered list of electronic devices. Alternatively, the given electronic device may transmit a frame in the sequence of one or more frames during a time slot after an unused transmit opportunity of the preceding electronic device in the ordered list of electronic devices.

In this trigger-based channel-access technique, the given electronic device may select a data rate and a length of the frame that it transmits in response to the trigger frame. For example, the information in the trigger frame may specify a maximum frame duration, and the frame from or transmitted by the given electronic device may have a duration that is less than or equal to the maximum frame duration. Thus, the lengths and/or the data rates of two or more of the frames received from the ordered list of electronic devices may be different from each other.

Moreover, the information in the trigger frame may specify explicit triggering. In these embodiments, access point 112 may transmit an additional trigger frame to the given electronic device in the ordered list of electronic devices. In response, the given electronic device may transmit the frame.

Furthermore, the information in the trigger frame may specify that each of the electronic devices in the ordered list of electronic devices may responds to the trigger frame (e.g., by transmitting a frame). Therefore, access point 112 may receive a frame from each of the electronic devices in the ordered list of electronic devices. However, in other embodiments, the electronic devices in the ordered list of electronic devices may only transmit at their corresponding access opportunities (which are indirectly specified by the ordered list of electronic devices) if they have uplink or queued data.

After the last electronic device in the ordered list of electronic devices has transmitted a frame or had an access opportunity, access point 112 may transmit a block acknowledgment to the ordered list of electronic devices. However, in other embodiments access point 112 transmits an acknowledgment to each of the electronic devices in the ordered list of electronic device after these electronic devices transmit a frame.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (e.g., that do not use multi-user trigger-based channel access). As described further below, the communication technique may also be implemented using a legacy electronic device.

In addition, note that the transmit power of the electronic devices in the ordered list of electronic devices may be proportional to a transmit bandwidth of these electronic device (as opposed to being proportional or scaling as a number of electronic devices N in the ordered list of electronic devices).

In these ways, the communication technique may allow electronic devices 110 and access point 112 to reduce contention in the WLAN and to improve communication performance. These capabilities may improve the user experience when using electronic devices 110.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which may also referred to as a throughput), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as one to ten seconds) to an estimated maximum number of bytes that can be communicated in the time interval (the latter of which may also be referred to as the capacity of a communication channel or link), and/or a ratio of an actual data rate to an estimated data rate (which may also be referred to as utilization).

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
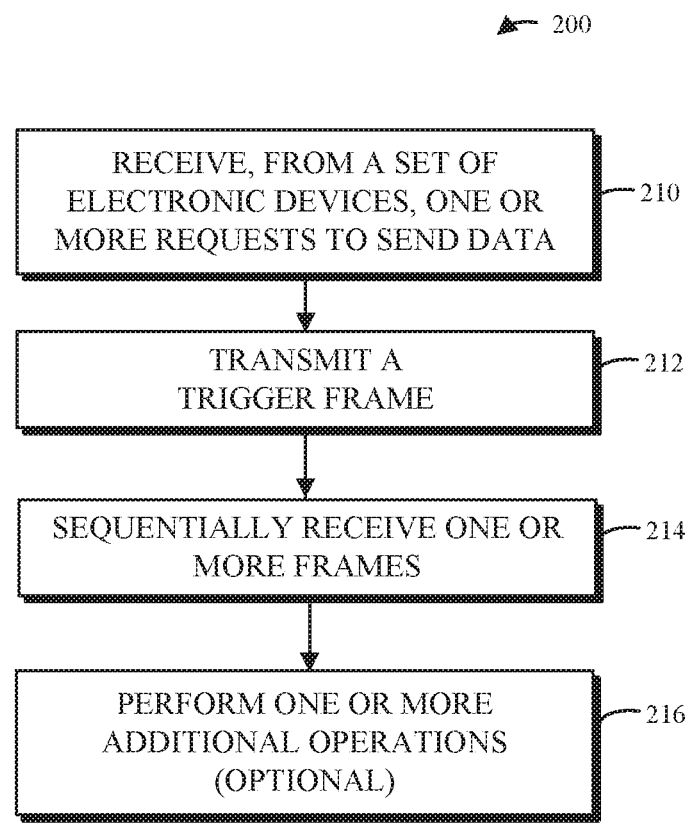
FIG. 2 is a flow diagram illustrating an example of a method for transmitting a trigger frame using one of the electronic devices in FIG. 1.

FIG. 2 presents a flow diagram 200 illustrating an example method for transmitting a trigger frame in accordance with some embodiments. This method may be performed by an access point (and, more generally, an electronic device), such as an interface circuit in access point 112 in FIG. 1. During operation, the access point optionally receives, from a set of electronic devices (which may include one or more electronic devices), one or more requests to send data (operation 210). The access point may transmit the trigger frame (operation 212) that includes information specifying an ordered list of electronic devices in the set of electronic devices that are allowed to transmit. Note that the trigger frame may be generated in response to the one or more requests to send data and/or as a periodic opportunity to transmit without a corresponding request. Subsequently, the access point may sequentially receive one or more frames (operation 214) from the ordered list of electronic devices.

In some embodiments, the access point optionally performs one or more additional operations (operation 216). For example, the information in the trigger frame may specify explicit triggering. In these embodiments, the access point may optionally transmit an additional trigger frame to a given electronic device in the ordered list of electronic devices, and the access point may optionally receive a frame in response to the additional trigger frame. Alternatively or additionally, the information in the trigger frame may optionally specify that each of the electronic devices in the ordered list of electronic devices responds to the trigger frame, and the access point may optionally receive a frame from each of the electronic devices in the ordered list of electronic devices.

Note that the access point may optionally transmit, to the ordered list of electronic devices, a block acknowledgment after receiving the last frame or after the last access opportunity specified by the ordered list of electronic devices. Alternatively, with the explicit triggering, the access point may optionally transmit an acknowledgment to the given electronic device in the ordered list of electronic devices after receiving a frame from the given electronic device.

Figure 3:
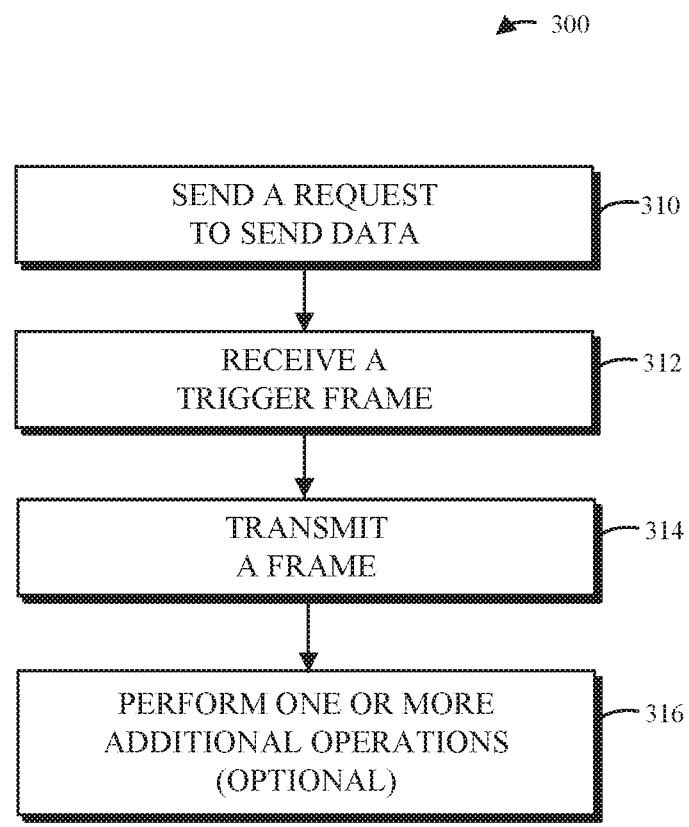
FIG. 3 is a flow diagram illustrating an example of a method for transmitting a frame using one of the electronic devices in FIG. 1.

FIG. 3 presents a flow diagram 300 illustrating an example method for transmitting a frame in accordance with some embodiments. This method may be performed by an electronic device, such as an interface circuit in electronic device 110-1 in FIG. 1. During operation, the electronic device optionally transmits, to an access point, a request to send data (operation 310). The electronic device may receive a trigger frame (operation 312) that includes information specifying an ordered list of electronic devices in the set of electronic devices that are allowed to transmit, where the information includes an identifier of the electronic device. Subsequently, the electronic device may transmit a frame to the access point (operation 314), where the frame is transmitted at a temporal position (such as a time slot) in a sequence of one or more frames from the ordered list of electronic devices. In particular, the electronic device may transmit the frame after another frame is transmitted by a preceding electronic device in the ordered list of electronic devices or during a time slot after an unused transmit opportunity of the preceding electronic device.

In some embodiments, the electronic device optionally performs one or more additional operations (operation 316). For example, the information in the trigger frame may specify explicit triggering. In these embodiments, the electronic device may optionally receive an additional trigger frame, and the electronic device may optionally transmit the frame in response to the additional trigger frame. Alternatively or additionally, the information in the trigger frame may optionally specify that each of the electronic devices in the ordered list of electronic devices responds to the trigger frame, and the electronic device may optionally transmit a null frame even when there is no queued or uplink data.

Note that the electronic device may optionally receive, from the access point, a block acknowledgment after the last frame in the sequence is transmitted by one of the ordered list of electronic devices or after the last access opportunity specified by the ordered list of electronic devices. Alternatively, with the explicit triggering, the electronic device may optionally receive an acknowledgment after receiving the frame from the electronic device.

In some embodiments of the method illustrated by the flow diagram 200 of FIG. 2 and/or the method illustrated by the flow diagram 300 of FIG. 3, there may be additional or fewer operations. Moreover, the order of the operations may be changed, and/or two or more operations may be combined into a single operation.

In some embodiments, at least some of the operations in the method illustrated by the flow diagram 200 of FIG. 2 and/or the method illustrated by the flow diagram 300 of FIG. 3 are performed by interface circuits in the access point or the electronic device. For example, at least some of the operations may be performed by firmware executed by an interface circuit, such as firmware associated with a MAC layer, as well as one or more circuits in a physical layer in the interface circuit.

Figure 4:
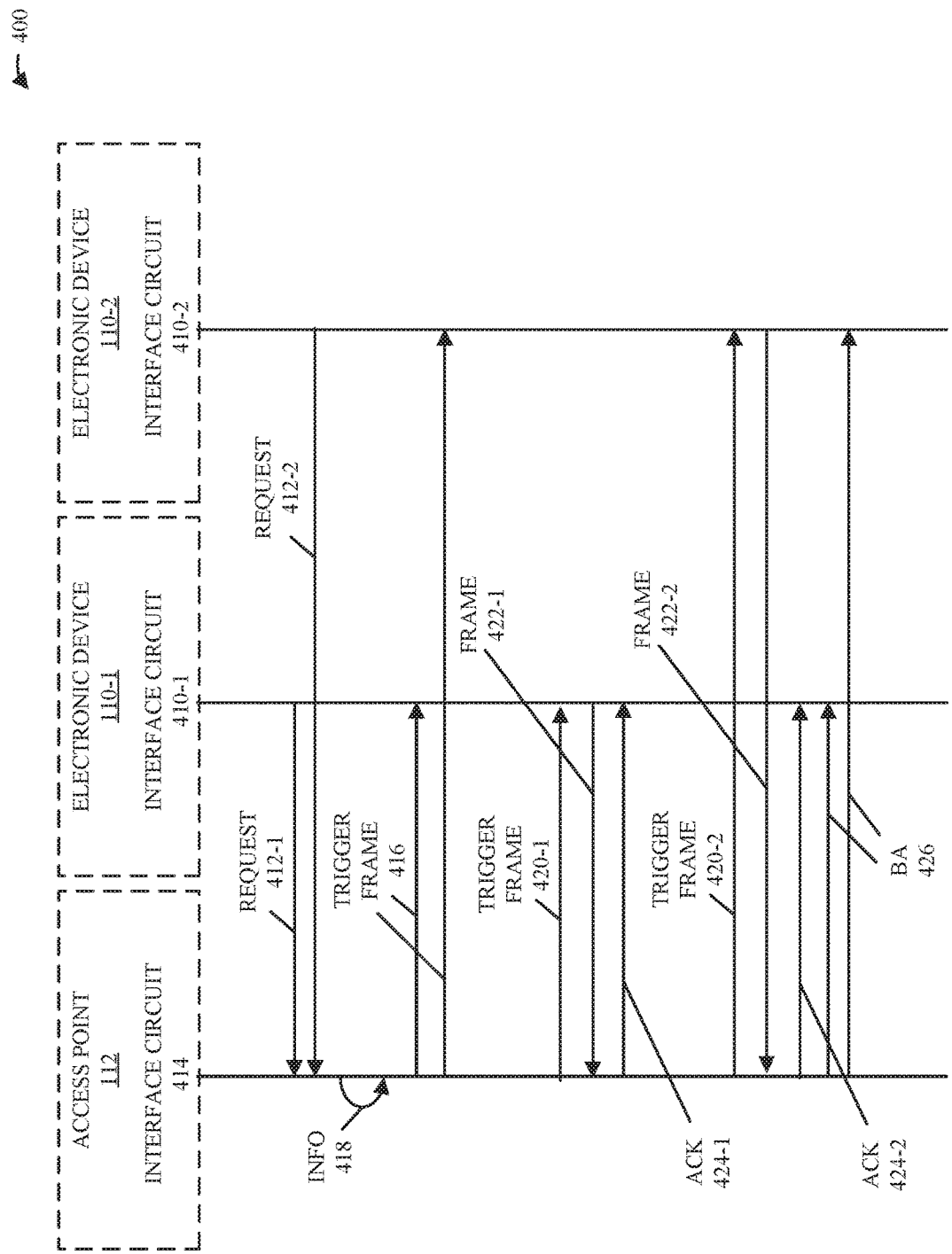
FIG. 4 is a flow diagram illustrating an example of communication between electronic devices, such as the electronic devices of FIG. 1.

The communication techniques are further illustrated in FIG. 4, which presents a flow diagram 400 illustrating an example of communication between electronic devices 110 and access point 112. In particular, interface circuits 410 in electronic devices 110 may optionally transmit one or more requests 412 that indicate that at least a subset of electronic devices 110 have uplink or queued data. In response to receiving the one or more requests 412, an interface circuit 414 in access point 112 may transmit trigger frame 416 that includes information 418 specifying an ordered list of electronic devices that are allowed to transmit.

After receiving trigger frame 416, electronic devices in the ordered list of electronic devices (such as electronic devices 110-1 and 110-2) may transmit a sequence of one or more frames 422 in a sequence specified by the ordered list of electronic devices. Moreover, interface circuit 414 may receive the one or more frames 422, and then may transmit a block acknowledgment (BA) 426 to the electronic devices in the ordered list of electronic devices.

In embodiments where the information in trigger frame 416 specifies explicit triggering, interface circuit 414 may transmit additional trigger frames 420 to the electronic devices in the ordered list of electronic devices, and interface circuit 414 may receive the one or more frames 422 in response to the additional trigger frames 420. Furthermore, in these embodiments, instead of block acknowledgment 426 interface circuit 414 may transmit acknowledgments (ACK) 424 to the electronic devices in the ordered list of electronic devices.

As described further below, the information may also specify that the electronic devices in the ordered list of electronic devices all transmit a frame in frames 422 in response to trigger frame 416. Alternatively, the electronic devices in the ordered list of electronic devices may transmit at their respective temporal positions in the sequence of one or more frames 422 (which is based on the ordered list of electronic devices) if they have queued or uplink data. For example, interface circuit 410-2 may transmit one of frames 422 after interface circuit 410-1 transmits another of frames 422 because electronic device 110-1 may precede electronic device 110-2 in the ordered list of electronic devices. However, if interface circuit 410-1 does not use its transmit or access opportunity, interface circuit 410-1 may transmit during a subsequent time slot after the unused transmit opportunity.

Representative Embodiments

We now describe embodiments of the communication technique. In contention-based channel-access techniques (such as EDCA), each of the electronic devices in the WLAN independently contends for the communication channel. However, as the number of electronic devices in the WLAN increases (which can result in increased congestion), the probability of a collision during channel access increases exponentially.

In contrast, in previously proposed trigger-based channel-access techniques with multi-user uplink transmission, an access point may initiate the transmission by the electronic devices. In particular, the access point may contend for the communication channel on behalf of the electronic devices. When the access point gains access, it may transmit a trigger frame to the electronic devices. This high-efficiency trigger frame may specify resource-unit allocation (or chunks of bandwidth) in OFDMA that effectively splits or divides the available bandwidth among the electronic devices. In response, the triggered electronic devices simultaneously access the shared channel without collisions, and simultaneously transmit their data using their allocated resource units in OFDMA. Then, the access point acknowledges the received frames using either a downlink multi-user block-acknowledgment frame or a new frame that is sometimes referred to as a 'multi-station block acknowledgment' or an 'm-STA BA.'

While these previously proposed trigger-based channel-access techniques can address the high collision rate in congested channels, there are some drawbacks. In particular, the previously proposed trigger-based channel-access techniques often require new physical layer capability to support multi-user uplink or downlink communication. Moreover, unused resource units typically cannot be used by other electronic devices and, thus, are wasted (i.e., there is bandwidth loss). Stated differently, all the electronic devices are allocated a chunk of bandwidth (or resource units) even when they have no uplink data to transmit.

Furthermore, the access point usually needs to maintain the buffer status of the electronic devices. Additionally, all of the addressed electronic devices typically need to transmit for exact same duration and at a data rate chosen by the access point. In particular, because there is one OFDMA frame, the access point may dictate the data rate and the duration (i.e., the length in bytes) to all the electronic devices. This approach is in contrast to current approaches in which the electronic devices determine these parameters. Note that the management of rate adaptation for all the electronic devices may be problematic if the link is asymmetric.

If a data packet does not fit in the specified duration, then an electronic device may have to cut or divide the data packet to fit in a frame in real time (such as after the trigger frame and during the short inter-frame space (SIFS). This is sometimes referred to as 'dynamic fragmentation.' Alternatively, the electronic device may have to pad the frame, which results in more bandwidth loss.

Furthermore, the previously proposed trigger-based channel-access techniques often have large access overhead for a single transmit opportunity (TXOP) transmission, such as approximately 15% for a 1-ms duration uplink physical layer convergence protocol (PLCP) protocol data unit (PPDU). In addition, the energy consumption to transmit may be significantly increased, such as proportionally to the number of electronic devices sharing the full bandwidth allocation. This is because the transmit time is increased because there is less bandwidth available because of the sharing among the addressed electronic devices.

For example, if an access point triggers N electronic devices (such as five electronic devices, 1 to 5) and provides an acknowledgment using a multi-electronic device block-acknowledgment frame, the access and protocol overhead may include: one EDCA access, one high-efficiency trigger frame, two SIFSs, and one multi-electronic device block-acknowledgment frame (or uplink multi-user block acknowledgment). In this example, the average data bandwidth per electronic device is the maximum bandwidth divided by N. Moreover, the energy to transmit per bit is N times more expensive (for the same modulation coding scheme in a single-user transmission). Consequently, the previously proposed trigger-based channel-access techniques can be inefficient.

The trigger-based channel-access technique in the present communication technique may provide several advantages relative to the previously proposed trigger-based channel-access techniques. Notably, the communication technique may allow implementation on legacy hardware. Moreover, the communication technique may improve interoperability and may provide fairness with legacy devices (i.e., the communication technique may be backwards compatible). Furthermore, the communication technique may provide efficient channel utilization (including low protocol overhead and efficient bandwidth utilization). For example, the communication technique may avoid padding or the use of dummy frames. Additionally, in the communication technique the transmit power may be proportional to actual electronic-device transmit bandwidth and may not be related to the number of electronic devices sharing the bandwidth. The trigger frame may use a high priority so that it shortens the duration of the EDCA. This may be useful when there is high congestion and/or high density such that multiple electronic devices are competing for the channel access. In addition, during time when the access point has reserved the channel with a network allocation vector (NAV), the access point may access the channel more quickly. Thus, the communication technique may provide efficient channel utilization in congested communication channels managed by a central device, such as an access point.

In particular, the communication technique provides a trigger-based channel-access technique, also referred to as a Triggered Wi-Fi Access Protocol (TWAP), for an access point to send a trigger frame. TWAP may provide an alternative solution to trigger-based channel access than the previously proposed trigger-based channel-access techniques that involve multi-user high-efficiency uplink transmissions.

During the communication technique, an access point may send a trigger frame. This trigger frame may include a network allocation vector or NAV duration. Moreover, the trigger frame may include information that specifies an ordered list of electronic devices (such as the association identifiers of the electronic devices in the ordered list of electronic devices) that are allowed to send a PPDU of any length and data rate selected by the electronic devices. Thus, in the communication technique there may not be dynamic fragmentation or padding required to fit into the current transmit opportunity (i.e., the NAV).

After receiving the trigger frame and waiting a SIFS time, the first addressed electronic device may be allowed to send an uplink PPDU. Alternatively if the designated electronic device has nothing to send (or is in doze state or a low-power mode), the electronic device may remain silent.

Then, the second addressed electronic device may access the air or the communication channel a SIFS time after the transaction by the first electronic device (including an acknowledgment) or the point coordination function inter-frame space or Point Control Function (PCF) Inter-frame Space (PIFS) time (i.e., the SIFS plus one slot) following the trigger frame if the first electronic device did not use its opportunity to transmit.

Moreover, the third (and subsequent) addressed electronic devices can access the air or the communication channel a SIFS time after the transaction by the previous electronic device (including an acknowledgement) or a slot time after the previous unused transmit opportunity.

Furthermore, once the last addressed electronic device has transmitted (or timed out), the access point might send a contention free-end (CF-End) frame to end the current transmit opportunity (if it was not fully used).

Figure 5:
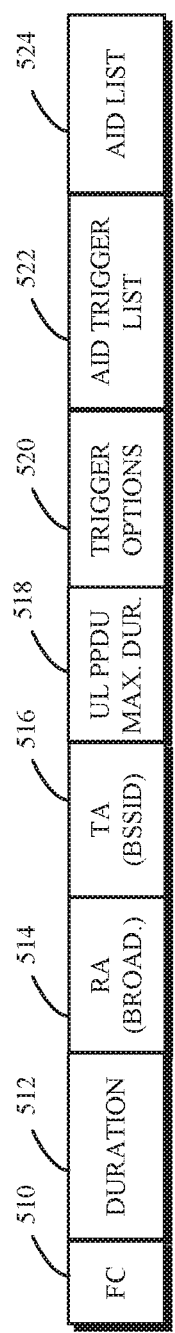
FIG. 5 is a drawing illustrating an example trigger frame communicated between at least two of the electronic devices in FIG. 1.

We now describe the format of the trigger frame and examples of the communication technique in more detail. FIG. 5 presents a drawing illustrating a trigger frame 500 communicated between at least two of the electronic devices in FIG. 1, such as access point 112 and electronic device 110-1. In particular, trigger frame 500 may include: frame control 510 (which, e.g., may be 2B), duration 512 (which, e.g., may be 2B and may specify the NAV), a receive address (RA) 514 (such as 'broadcast'), a transmit address (TA) 516 (which, e.g., may be 6B and may specify the basic service set identifier (BSSID) of the access point), the uplink (UL) PPDU maximum duration 518 (which, e.g., may be 2B and may have units of microseconds), trigger options 520 (which, e.g., may be 1B), an association identifier (AID) list length 522 (which, e.g., may be 1B) and AID list 524 (which, e.g., may have a variable length). While example lengths in bytes are provided, any/all of the lengths may be modified in other implementations, and one or more fields may be added, removed, or modified in other trigger frame implementations.

Trigger frame 500 may be a new control frame. Note that it may not include allocation of resource units. Instead, it may specify an ordered list of electronic devices (AID list 524) that are addressed (such as electronic devices 1, 3 and 5) that can use uplink communication using time-domain multiple access in the order specified in AID list 524. These electronic devices can use any data rate do long as it fits in the UL PPDU maximum duration 518. The purpose of AID list 524 is to advertise a sorted list of AIDs that are selected to use the current TXOP allocated by the access point.

Note that, if non-zero, the UL PPDU maximum duration 518 defines the maximum allowed duration for UL PPDU frames. However, if the UL PPDU maximum duration 518 is zero, the PPDU duration is limited by the NAV. Moreover, trigger options 520 may specify several optional TWAP settings or parameters. For example, an explicit trigger value of '1' may specify explicit triggering. During explicit triggering, the electronic devices in AID list 524 may be expected to transmit only following an explicit trigger from the access point in the TXOP. Otherwise, the electronic devices can transmit according to their order in AID list 524. Furthermore, a UL required value of '1' may specify that the electronic devices in AID list 524 are expected to transmit even if they have no data to send (in these embodiments a quality-of-service or QoS null frame may be sent). Otherwise, electronic devices without data can skip their transmission opportunity. Additionally, an m-STA block acknowledgement (BA) value of '1' may specify that the access point may acknowledge electronic-device UL data using a single m-STA BA frame at the end of the TWAP TXOP. Otherwise, an immediate acknowledge may follow each UL PPDU from each of the electronic devices in AID list 524.

We now describe several access protocol examples. During the communication technique, in response to one or more electronic devices sending requests that specify bandwidth and latency, the access point may transmit a trigger frame with an ordered list of electronic devices. These electronic devices may transmit at their sequential times if they have uplink or queued data. Otherwise, an electronic device may not transmit. When that occurs, the next electronic device in the ordered list of electronic devices may wait at least one slot before transmitting. Note that the NAV may be up to 32 ms. In order to maintain fairness with other devices on the channel, a typical value of up to 8 ms may be used. If there is not enough time for an electronic device (such as the last electronic device in the ordered list of electronic devices) to transmit, this electronic device may not transmit anything. Instead, the electronic device may wait to transmit in response to the next trigger frame.

Figure 6:
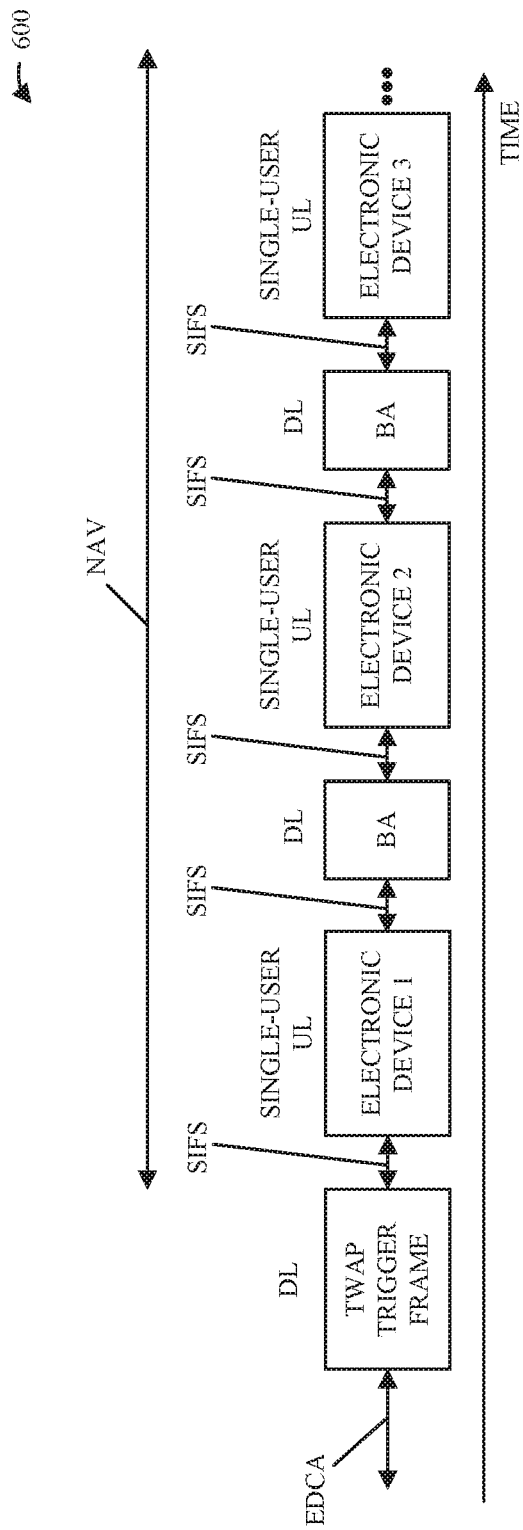
FIGS. 6, 7, and 8 illustrate timing diagrams of example communication between electronic devices, such as the electronic devices of FIG. 1.

FIG. 6 presents a timing diagram 600 illustrating an example of communication between access point 112 and electronic devices 110 in FIG. 1. In this example, the access point may trigger at least three electronic devices (1 to 3), all of which may have uplink traffic. Each triggered device transmits in its designated slot. In FIG. 6, note that m-STA BA equals '0' (i.e., no multi-STA BA will be transmitted, instead individual BAs will be sent) and explicit Trigger equals '0' (i.e., the fames will not be separately triggered).

Figure 7:
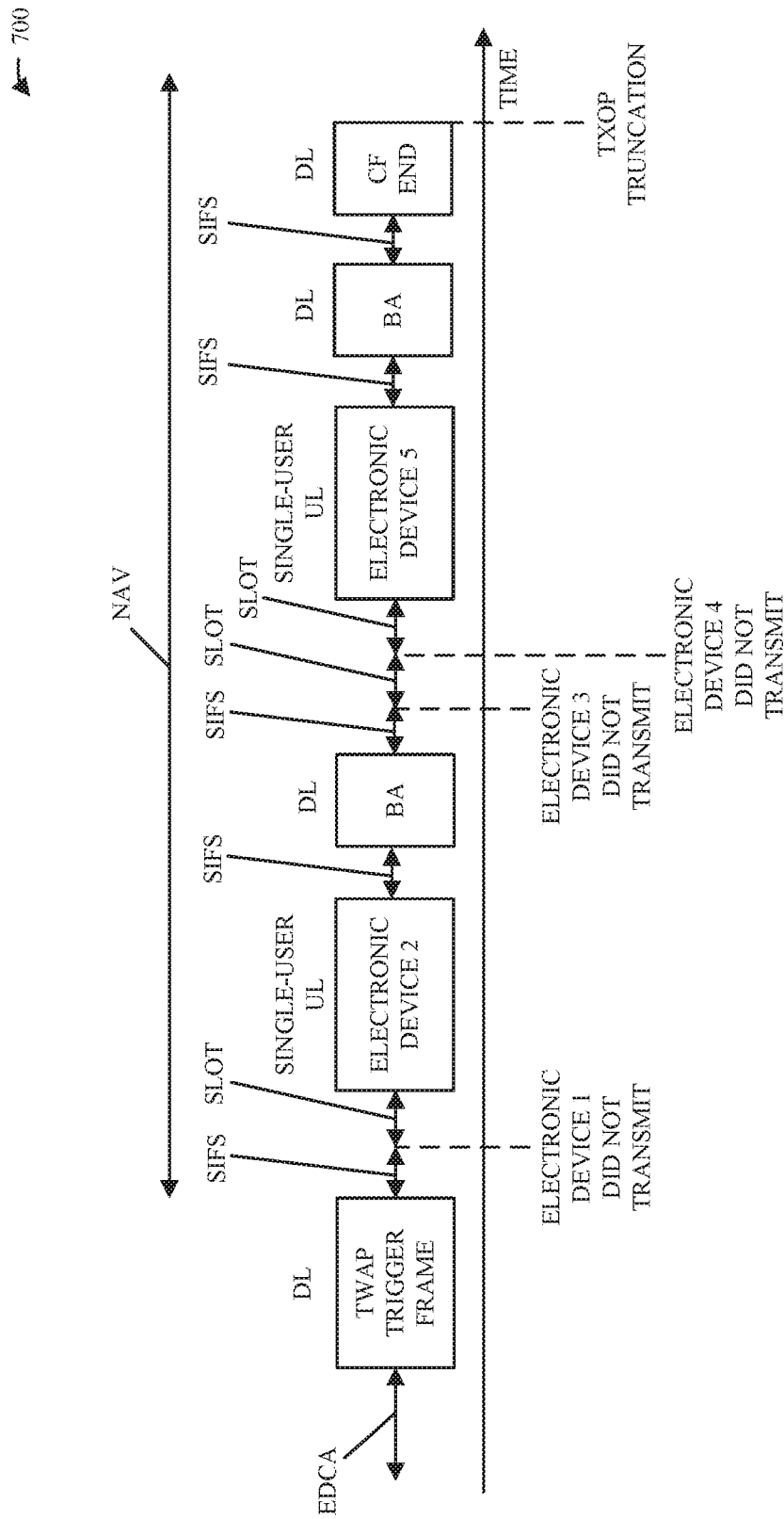

FIG. 7 presents a timing diagram 700 illustrating an example of communication between access point 112 and electronic devices 110 in FIG. 1. In this example, the access point may trigger, e.g., five electronic devices (1 to 5), but only electronic devices 2 and 5 have uplink traffic. In FIG. 7, m-STA BA equals '0,' explicit trigger equals '0' and required equals '0' (i.e., each electronic device is not required to transmit even when it has no data). Each device transmits in its designated order, after an unused slot associated with the preceding device. Because the ordered list of electronic devices completes transmission in less than the allotted time, the access point may truncate the NAV.

Figure 8:
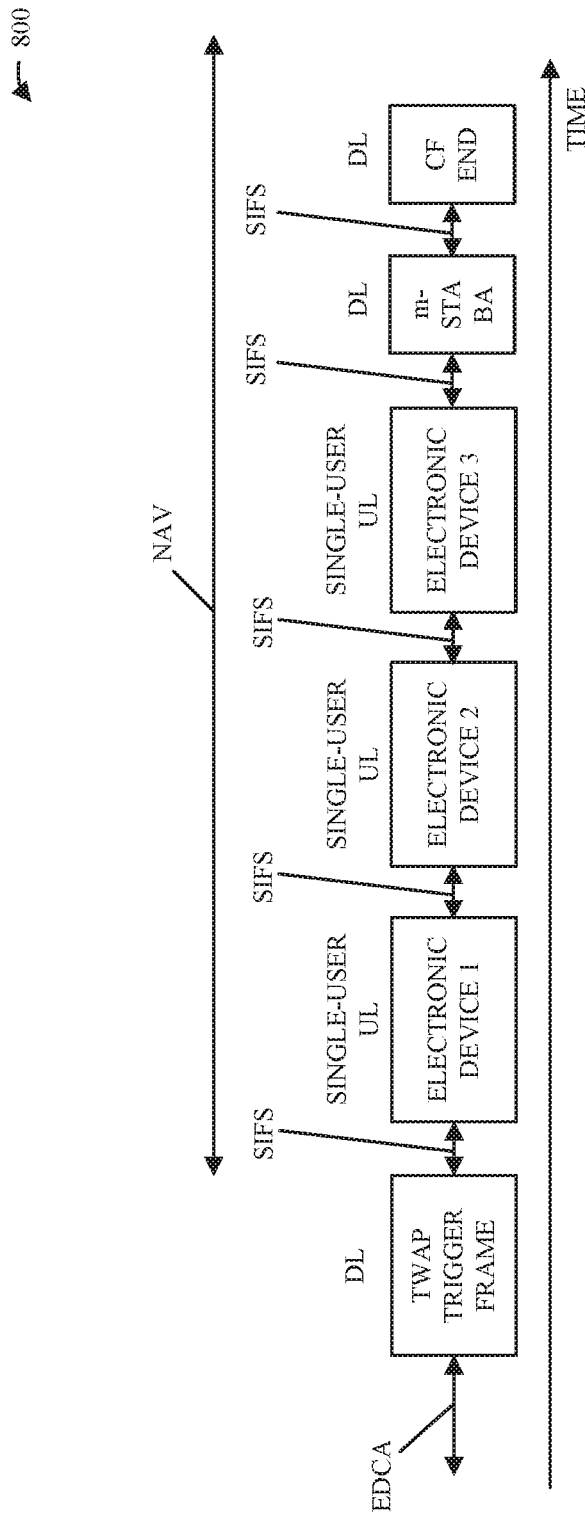

FIG. 8 presents a timing diagram 800 illustrating an example of communication between access point 112 and electronic devices 110 in FIG. 1. In this example, the access point may trigger three electronic devices (1 to 3), all of which may have uplink traffic. Each triggered electronic device transmits in its designated slot, and a multi-STA BA (m-STA BA) is transmitted after the last uplink transmission. In FIG. 8, note that m-STA BA equals '1' and explicit Trigger equals '0.'

Figure 9:
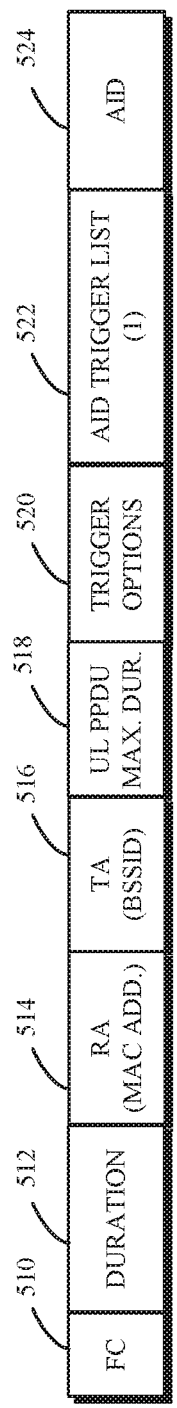
FIG. 9 is a drawing illustrating an example trigger frame communicated between at least two of the electronic devices in FIG. 1.

We now describe the explicit trigger packet format. The purpose of the explicit trigger frame is to trigger a particular electronic device during the TWAP TXOP as an option to overcome potential hidden node issues where some of the electronic devices in the ordered list of electronic devices are unable to hear one or more other electronic devices in the ordered list. FIG. 9 presents a drawing illustrating a trigger frame 900 communicated between two or more of the electronic devices in FIG. 1, such as access point 112 and electronic device 110-1. While explicit trigger frame 900 has the same format as trigger frame 500, the values in some of the fields are different. In particular, receive address 514 may be the MAC address of the electronic device, AID list length 522 may be '1' (specifying a single electronic device), and AID list 524 may include the AID of the electronic device.

Figure 10:
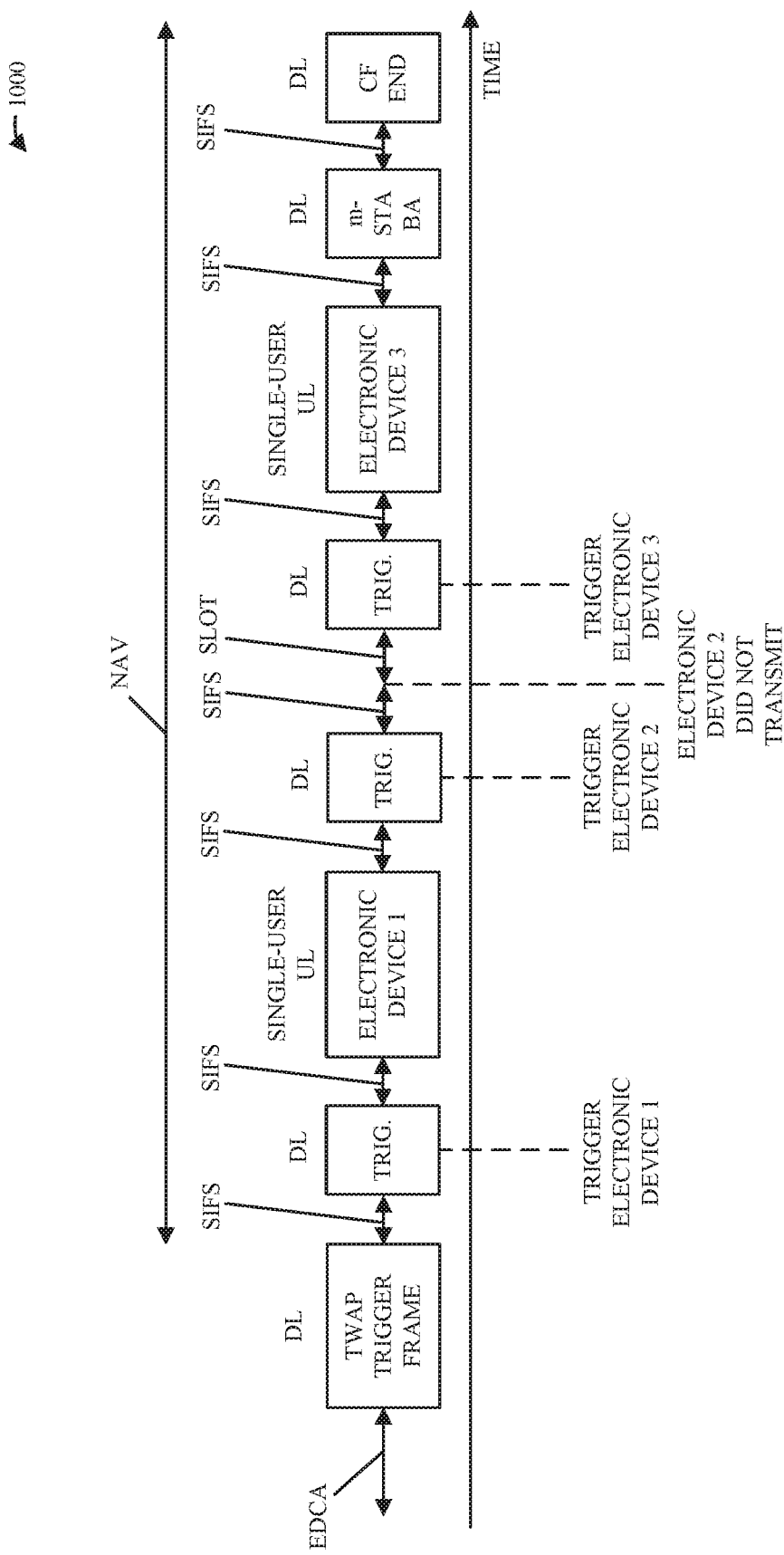
FIGS. 10 and 11 illustrate timing diagrams of example communication between electronic devices, such as the electronic devices of FIG. 1.

FIG. 10 presents a timing diagram 1000 illustrating an example of communication between access point 112 and electronic devices 110 in FIG. 1. In this example, the access point may trigger three electronic devices (1 to 3), only electronic devices 1 and 3 may have uplink traffic. In particular, the electronic devices may be triggered one-byone by the access point. This approach may eliminate the need for the electronic devices to count slots/transmit times (instead, this is handled by the access point). In FIG. 10, note that m-STA BA equals '1,' explicit Trigger equals '1' and required equals '0.'

Note that if the transmission takes a fixed duration, then electronic devices that are not addressed can go to sleep immediately. Otherwise, if the transmission is shorter than maximum time and an electronic device has gone to Doze, then the electronic device may sleep until the end of the reserved time and the electronic device may not be available to receive transmissions from the access point.

Figure 11:
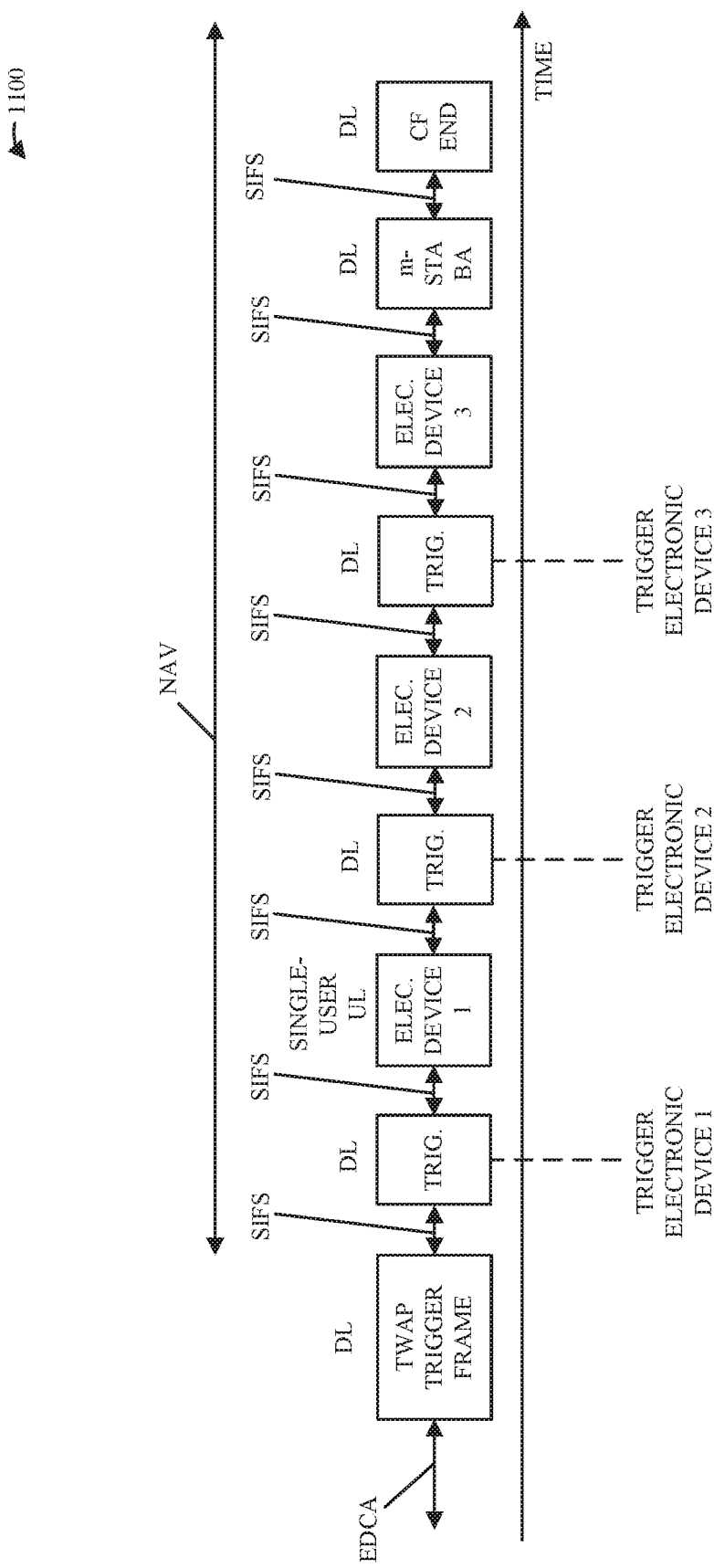

FIG. 11 presents a timing diagram 1100 illustrating an example of communication between access point 112 and electronic devices 110 in FIG. 1. In this example, the access point may trigger three electronic devices (1 to 3), all of which may have uplink traffic. In FIG. 11, note that m-STA BA equals '1,' explicit Trigger equals '1' and required equals '1.'

The communication technique may be implemented on legacy devices, i.e., using legacy hardware. In particular, following a TWAP Trigger frame, each addressed electronic device may configure its air access parameters to: arbitration inter-frame spacing (AIFS) equal to SIFS plus (N−1) times slot, where N equals the AID order in the ordered list of electronic devices (starting from one); and the contention window (CW) equal to '0' (always draw back off equal to '0'). Following a receive frame during a TXOP without explicit triggering, each addressed electronic device may configure its air access parameters to: AIFS equal to SIFS plus (R−1) times slot, where R equals the AID order in the ordered list of electronic devices from here or this point; and the CW equal to '0' (always draw back off equal to '0'). For example, for the fifth electronic device in the ordered list of electronic devices, AIFS equals SIFS plus four slots.

Alternatively, with explicit triggering, an addressed electronic device waits for the access point to transmit a trigger (which is simpler, but has higher overhead). In particular, the TXOP obtained for the first trigger frame (when NAV is not set) may use EDCA access to enable random and fair access to all electronic devices in the area. EDCA parameters may be good for the access point, but some backoff calculation should be included. When the access point has reserved a duration for its transmissions, the access point may access the channel after a SIFS or PIFS, if it does not receive response. Thus the channel access overhead may be reduced and transmission time use may be efficient, i.e., the reserved transmission time may be used as efficiently as possible.

Tables 1 and 2, respectively, provide a comparison of the performance of multi-user trigger-based channel access (MU-TBCA) and TWAP. In these examples, there are N electronic devices, with 20 MHz bandwidth, a number of spatial streams of '1,' User Datagram Protocol (UDP) transmit BE, maximum throughput (modulation coding scheme of 7 and 0.8 μs guard interval, m-STA BA equal to '0' and explicit trigger equal to '0.' Note that for TWAP, the TXOP per electronic device is 1000 μs. In addition, the TWAP throughput gain is because of the increased BW relative to OFDMA.

TABLE 1

| Bandwidth (MHz) | 20 | 20 | 20 |
|---|---|---|---|
| RU tones | 242 | 106 | 52 |
| N STAs | 1 | 2 | 4 |
| EDCA access overhead (μs) | 104 | 104 | 104 |

TABLE 1-continued

| Trigger overhead (+SIFS) (μs) | 100 | 100 | 100 |
|---|---|---|---|
| PPDU duration (μs) | 852 | 1852 | 3852 |
| Block acknowledgment overhead (+SIFS) (μs) | 48 | 48 | 48 |
| Total Overhead (N STAs) (μs) | 252 | 252 | 252 |
| Physical layer rate (Mbps) | 86 | 37.5 | 17.6 |
| Throughput per STA (Mbps) | 66.4 | 33 | 16.5 |
| Transmit power penalty ratio | 1 | 2.29 | 4.89 |

TABLE 2

| Bandwidth (MHz) | 20 | 20 | 20 |
|---|---|---|---|
| RU tones | 242 | 106 | 52 |
| N STAs | 1 | 2 | 4 |
| EDCA access overhead (μs) | 104 | 104 | 104 |
| Trigger overhead (+SIFS) (μs) | 100 | 100 | 100 |
| PPDU duration (μs) | 852 | 1852 | 3852 |
| Block acknowledgment overhead (+SIFS) (μs) | 48 | 48 | 48 |
| Total Overhead (N STAs) (μs) | 252 | 252 | 252 |
| Physical layer rate (Mbps) | 86 | 37.5 | 17.6 |
| Throughput per STA (Mbps) | 66.4 | 34.7 | 18.3 |
| TWAP throughput gain (%) | 0 | 5 | 11 |

We now describe embodiments of an electronic device. FIG. 12 presents a block diagram of an electronic device 1200 (which may be an access point, another electronic device, such as a station or a legacy electronic device) in accordance with some embodiments. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, application-specific integrated circuits (ASICs), microcontrollers, programmable-logic devices, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: one or more program modules or sets of instructions (such as program module 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Figure 12:
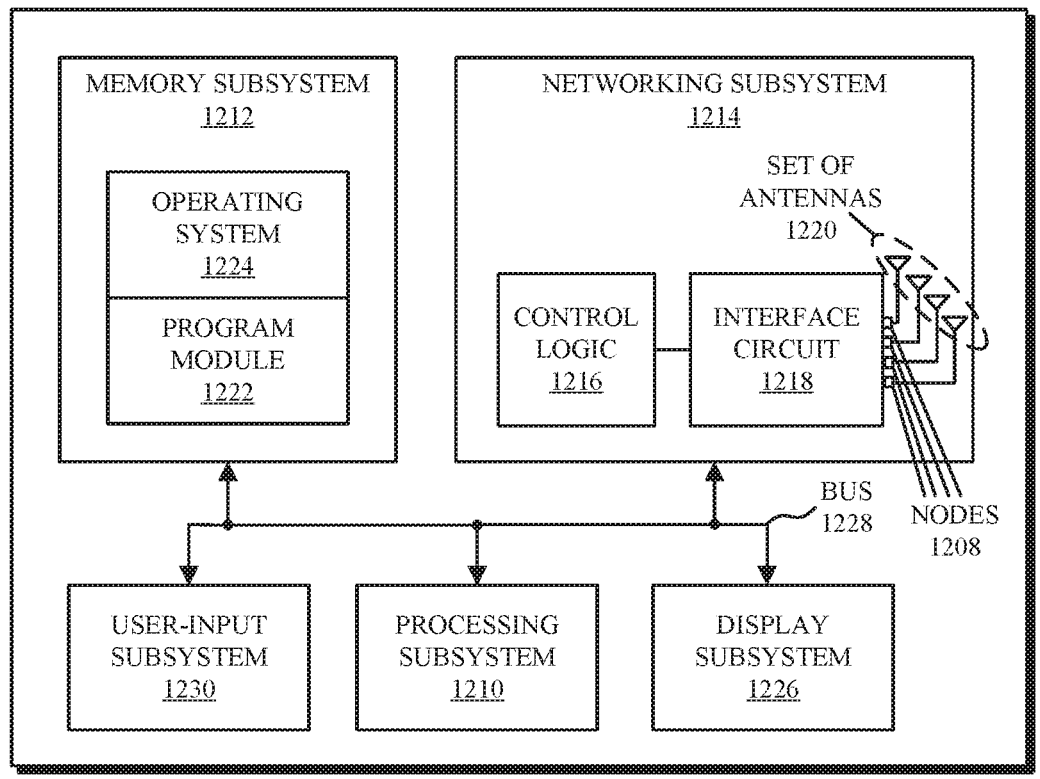
FIG. 12 is a block diagram illustrating an example of one of the electronic devices of FIG. 1.

Networking subsystem 1214 includes one or more devices configured to couple to and communicate on a wired and/or wireless network (i.e., to perform network operations), including: control logic 1216, an interface circuit 1218 and a set of antennas 1220 (or antenna elements) in an adaptive array that can be selectively turned on and/or off by control logic 1216 to create a variety of optional antenna patterns or 'beam patterns.' (While FIG. 12 includes set of antennas 1220, in some embodiments electronic device 1200 includes one or more nodes, such as nodes 1208, e.g., a pad, which can be coupled to set of antennas 1220. Thus, electronic device 1200 may or may not include set of antennas 1220.) For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices.

Within electronic device 1200, processing subsystem 1210, memory subsystem 1212, and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program module 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1222, operating system 1224 (such as a driver for interface circuit 1218) or in firmware in interface circuit 1218. Alternatively or additionally, at least some of the operations in the communication technique may be implemented in a physical layer, such as hardware in interface circuit 1218. In some embodiments, the communication technique is implemented, at least in part, in a MAC layer and/or in a physical layer in interface circuit 1218.

Furthermore, in general, the communication technique may be used to facilitate scheduled channel access in time and/or frequency in conjunction with multi-user multiple input multiple output (MU-MIMO) and/or OFDMA.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
one or more nodes configured to communicatively couple to an antenna; and
an interface circuit, communicatively coupled to the one or more nodes, configured to communicate with a set of electronic devices in a wireless local area network (WLAN), and configured to cause the access point to:
transmit, to the set of electronic devices, a trigger frame that includes information specifying an ordered list of electronic devices in the set of electronic devices that are allowed to transmit in time sequential order based on the ordered list of electronic devices; and
in response to the trigger frame, receive a sequence of non-overlapping, time-sequential frames from the ordered list of electronic devices included in the trigger frame, wherein the sequence of non-overlapping, time-sequential frames comprises null frames and data frames,
wherein:
the trigger frame specifies a maximum frame duration for individual frames transmitted by the ordered list of electronic devices, and
each frame of the sequence of non-overlapping, time-sequential frames have durations that are less than or equal to the maximum frame duration.

2. The access point of claim 1, wherein lengths and/or data rates of two or more frames of the sequence of non-overlapping, time-sequential frames received from the ordered list of electronic devices differ from each other.

3. The access point of claim 1, wherein:
the trigger frame comprises a media access control (MAC) header and a field following the MAC header that includes an ordered list of association identifiers specifying the ordered list of electronic devices.

4. The access point of claim 1, wherein the information specifies explicit triggering; and
wherein the interface circuit is further configured to cause the access point to:
transmit an additional trigger frame to a given electronic device in the ordered list of electronic devices; and
receive, from the given electronic device, a frame in response to the additional trigger frame.

5. The access point of claim 1, wherein:
the information specifies that each electronic device in the ordered list of electronic devices must respond to the trigger frame with a data frame or a null frame, and
in response to the trigger frame, the interface circuit of the access point receives a frame in the sequence of non-overlapping, time-sequential frames from each electronic device in the ordered list of electronic devices.

6. The access point of claim 1, wherein the interface circuit is compatible with an Institute of Electrical and Electronics Engineers (IEEE) 802.11 standard that includes trigger-based channel access, and the interface circuit is further configured to cause the access point to communicate with one or more legacy electronic devices that are not compatible with the IEEE 802.11 standard.

7. The access point of claim 1, wherein the trigger frame includes a one-bit multiple station (m-STA) block acknowledgement (BA) value that indicates whether the access point provides i) acknowledgements to frames received from each electronic device individually or ii) a block acknowledgment to all of the electronic devices.

8. An electronic device, comprising:
one or more nodes configured to communicatively couple to an antenna; and
an interface circuit, communicatively coupled to the one or more nodes, configured to communicate with an access point in a wireless local area network (WLAN), and configured to cause the electronic device to:
receive, from the access point, a trigger frame that includes information specifying an ordered list of electronic devices in a set of electronic devices that are allowed to transmit in time sequential order based on the ordered list of electronic devices, the information including an identifier of the electronic device; and
in response to the trigger frame, transmit a frame at a temporal position in a sequence of non-overlapping, time-sequential frames from the ordered list of electronic devices included in the trigger frame, wherein the sequence of non-overlapping, time-sequential frames comprises null frames and data frames,
wherein:
the temporal position for the electronic device to transmit is specified by the information in the trigger frame,
the information specifies a maximum frame duration for individual frames transmitted by the ordered list of electronic devices, and
the interface circuit is further configured to cause, in response to the trigger frame, the electronic device to select an amount of data to include in the frame and a data rate such that the frame has a duration that is less than or equal to the maximum frame duration.

9. The electronic device of claim 8, wherein the trigger frame comprises a media access control (MAC) header and a field following the MAC header that includes an ordered list of association identifiers specifying the ordered list of electronic devices.

10. The electronic device of claim 8, wherein:
the information specifies explicit triggering; and
the interface circuit is further configured to cause the electronic device to receive an additional trigger frame from the access point, and to transmit the frame in response to receipt of the additional trigger frame.

11. The electronic device of claim 8, wherein:
the information specifies that each electronic device in the ordered list of electronic devices must respond to the trigger frame with a data frame or a null frame; and
the interface circuit is further configured to cause the electronic device to transmit the frame comprising the null frame to the access point, when the electronic device has no queued data to send.

12. The electronic device of claim 8, wherein the interface circuit is further configured to transmit the frame after another frame is transmitted by a preceding electronic device in the ordered list of electronic devices or during a time slot after an unused transmit opportunity of the preceding electronic device.

13. The electronic device of claim 8, wherein the interface circuit is compatible with an Institute of Electrical and Electronics Engineers (IEEE) 802.11 standard that includes trigger-based channel access, and the interface circuit is further configured to cause the electronic device to communicate with one or more access points that are not compatible with the IEEE 802.11 standard.

14. The electronic device of claim 8, wherein the trigger frame includes a one-bit multiple station (m-STA) block acknowledgement (BA) value that indicates whether the access point provides i) acknowledgements to frames received from each electronic device individually or ii) a block acknowledgment to all of the electronic devices.

15. A method for transmitting a frame, comprising:
via an interface circuit of an electronic device:
receiving, from an access point, a trigger frame that includes information specifying an ordered list of electronic devices in a set of electronic devices that are allowed to transmit in time sequential order based on the ordered list of electronic devices, the information including an identifier of the electronic device; and
in response to the trigger frame, transmitting a frame at a temporal position in a sequence of non-overlapping, time-sequential frames from the ordered list of electronic devices, included in the trigger frame, wherein the sequence of non-overlapping, time-sequential frames comprises null frames and data frames,
wherein:
the temporal position for electronic device to transmit is specified by the information in the trigger frame,
the information specifies a maximum frame duration for individual frames transmitted by the ordered list of electronic devices, and
the method further includes selecting an amount of data to include in the frame and a data rate such that the frame has a duration that is less than or equal to the maximum frame duration.

16. The method of claim 15, wherein:
the trigger frame comprises a media access control (MAC) header and a field following the MAC header that includes an ordered list of association identifiers specifying the ordered list of electronic devices.

17. The method of claim 15, wherein:
the information specifies that each electronic device in the ordered list of electronic devices must respond to the trigger frame with a data frame or a null frame; and
wherein the frame comprises the null frame when the electronic device has no queued data to send.

* * * * *